(12) United States Patent
O'Leary et al.

(10) Patent No.: US 7,862,356 B1
(45) Date of Patent: Jan. 4, 2011

(54) BUSWAY WATER RESISTANT JOINT PACK OR PLUG-IN UNIT JOINT

(76) Inventors: Timothy O'Leary, 5900 Belle Oaks Pl., Antioch, TN (US) 37013; Wesley Travis, 888 County Farm Rd., Murfreesboro, TN (US) 37127; Thomas N. Lesieur, 205 Montcalm La., Murfreesboro, TN (US) 37129

( * ) Notice: Subject to any disclaimer, the term of this patent is extended or adjusted under 35 U.S.C. 154(b) by 0 days.

(21) Appl. No.: 12/619,757

(22) Filed: Nov. 17, 2009

(51) Int. Cl.
*H01R 4/60* (2006.01)
(52) U.S. Cl. ...................... 439/213; 174/68.2
(58) Field of Classification Search ............... 439/213, 439/212, 210, 211; 174/68.2, 88 B
See application file for complete search history.

(56) References Cited

U.S. PATENT DOCUMENTS

| | | | | |
|---|---|---|---|---|
| 2,310,919 | A * | 2/1943 | Adam .................. | 174/99 B |
| 3,365,537 | A | 1/1968 | Fehr, Jr. et al. | |
| 3,786,394 | A * | 1/1974 | Koenig et al. ............ | 439/213 |
| 4,009,920 | A * | 3/1977 | Hicks et al. .............. | 439/213 |
| 4,029,379 | A * | 6/1977 | Kotala et al. ............. | 439/213 |
| 4,504,180 | A * | 3/1985 | Ishii et al. ................. | 411/5 |
| 4,627,680 | A * | 12/1986 | Weimer et al. ........... | 439/210 |
| 4,979,906 | A | 12/1990 | Shrout et al. ............. | 439/213 |
| 5,401,906 | A | 3/1995 | Bryant ..................... | 174/88 B |
| 5,415,557 | A | 5/1995 | Chapman et al. ......... | 439/142 |
| 5,486,651 | A * | 1/1996 | Morgan .................... | 174/68.2 |
| 5,760,339 | A | 6/1998 | Faulkner et al. ......... | 174/88 B |
| 6,180,885 | B1 | 1/2001 | Goldman et al. ......... | 174/68.2 |
| 6,329,598 | B1 | 12/2001 | M'Sadoques et al. ...... | 174/68.2 |

* cited by examiner

*Primary Examiner*—Hae Moon Hyeon

(57) ABSTRACT

An electrical busway system includes a joint assembly having a joint housing with an upper plate and a lower plate. The lower plate has a nut-receiving hole. A top mounted bolt secures a plurality of electrical conductors to the joint housing, the conductors being mounted between the upper plate and the lower plate. A nut is connected to a threaded end of the bolt, the nut having a main body positioned at least in part within the nut-receiving hole and a tightening end positioned outside the nut-receiving sleeve. A nut gasket is provided for the main body of the nut within the nut-receiving hole to form a sealed zone for preventing water entry into the joint housing.

24 Claims, 6 Drawing Sheets

BUSWAY WATER RESISTANT JOINT PACK OR PLUG-IN UNIT JOINT

FIELD OF THE INVENTION

This invention is directed generally to a busway electrical system, and, more particularly, to a water resistant bolt-on joint for field connection of plug-in units to a busway or for field connection of a joint-pack to two adjacent busway sections.

BACKGROUND OF THE INVENTION

Busway electrical distribution systems are well known in the art of electrical distribution. Busway systems have a number of factory assembled sections, each section including stacked busbars that are enclosed within a busway housing. Typically, a joint-pack connects two adjacent sections of a busway. The joint-pack includes a nut and bolt fastener that secures a plurality of conductors electrically and mechanically to busbars of the adjacent busbar sections. During installation or maintenance procedures, the installer removes water resistant seals of the joint-pack to access the nut or bolt, and, after completing the installation, places the water resistant seals back in the appropriate mounted position.

For distribution of the electrical energy, the busway sections include plug-in outlets for exposing conductive material of the busbars, the conductive material being connected to a plug-in unit. In some systems, a bolt-on joint connects the plug-in unit to the busway. Similar to the joint-pack, a nut and bolt fastener secures the bolt-on joint to busbars of the busway. The bolt-on joint and the joint-pack typically require features for protection against environmental elements, such as water and dust.

SUMMARY OF THE INVENTION

In an implementation of the present invention, an electrical busway system includes a joint assembly in which retightening of the components is performed without removal of water seal covers or plugs. The joint assembly can be either a joint pack, which is generally used to connect two adjacent busway sections, or a bolt-on joint, which is generally used to connect a plug-in unit to a plug-in outlet of a busway. Specifically, the joint assembly has a joint housing in which a nut forms a water sealed zone while simultaneously being accessible for maintenance procedures. The nut is connected to a threaded end of the bolt to capture and tighten the electrical conductors to corresponding busbars of a busbar section. The nut has a main body with a mounted nut gasket that is positioned within a nut-receiving hole of the joint housing for preventing water entry into the joint housing. The nut further includes a tightening end that is positioned outside the nut-receiving hole, and, thus, outside the nut-sealed zone, for providing retightening access without requiring removal of any water seal components (e.g., covers, plugs, etc.).

In an alternative implementation of the present invention, an electrical system has a plurality of busway sections including a first busway section and an adjacent second busway section, each of the busway sections having stacked busbars and a plug-in outlet for distributing electrical current to an electrical device. The electrical system further includes a joint assembly that mounts the first busway section to the adjacent second busway section busbar. The busway sections may for example be two straight sections, or may be a straight section and a plug in unit.

The joint assembly includes a plurality of electrical conductors and insulators mounted in a joint housing, the electrical conductors being in contact with corresponding ones of the busbars. A bolt, having a bolt head and a threaded end, secures the electrical conductors to the joint housing, wherein the bolt head is located internally within an upper sleeve that is located in an upper plate of the joint housing. A lower sleeve is located in a lower plate of the joint housing. A nut has a tubular body and an exposed end, the tubular body having a gasket-retaining groove that is mounted within the lower sleeve, the exposed end being located externally of the lower sleeve. A nut gasket is mounted in the groove of the tubular body for forming a water-tight seal between the nut and the lower sleeve.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

The invention may best be understood by reference to the following description taken in conjunction with the accompanying drawings.

DETAILED DESCRIPTION OF THE ILLUSTRATED EMBODIMENTS

Although the invention will be described in connection with certain preferred embodiments, it will be understood that the invention is not limited to those particular embodiments. On the contrary, the invention is intended to include all alternatives, modifications and equivalent arrangements as may be included within the spirit and scope of the invention as defined by the appended claims.

Figure 1:
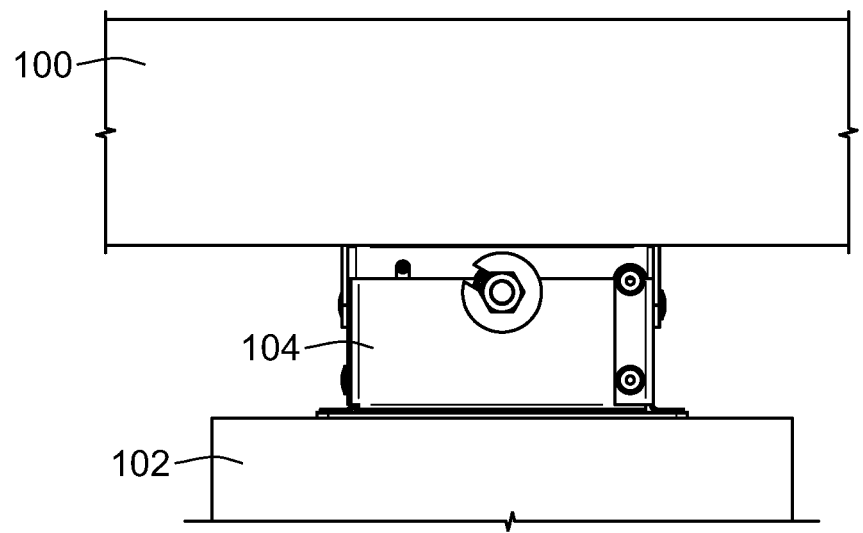
FIG. 1 is an upper view of a busway system having a plug-in unit mounted to a busway via a bolt-on joint.
Figure 2:
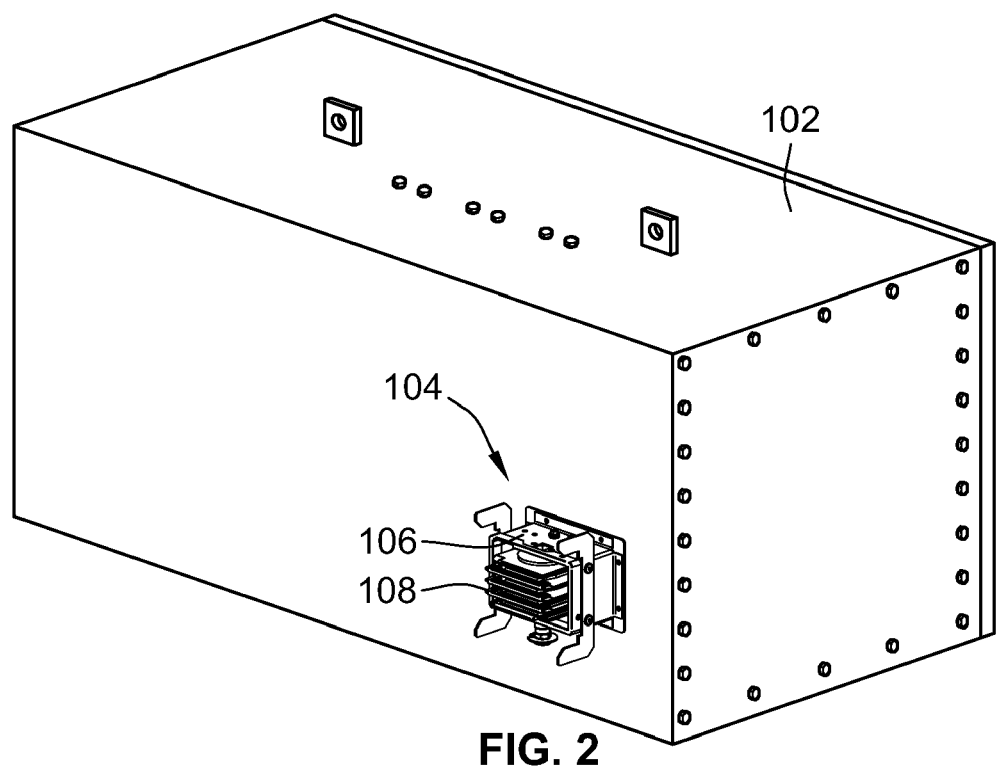
FIG. 2 is a perspective view of the plug-in unit and bolt-on joint shown in FIG. 1.

Referring to FIGS. 1 and 2, an electrical busway system includes a busway section 100 to which a plug-in unit 102 is connected via a joint assembly 104. According to one embodiment, the joint assembly 104 is a bolt-on joint having a housing 106 that is mounted to a back side of the plug-in unit 102. The housing 106 encloses in part a plurality of electrical conductors 108 that provide an electrical connection between busbars of the busway section 100 and an electrical device (e.g., a circuit breaker or a switch) of the plug-in unit 102. The electrical conductors 108 are separated by insulators 109 (shown in FIG. 3).

As described in more detail below, the bolt-on joint 104 is a water resistant joint assembly that improves the field connection of the plug-in unit 102 to the busway section 100. In addition to being water resistant, the bolt-on joint 104 is also resistant to ingress of other environmental elements, such as dust, pollution contaminants, etc. The bolt-on joint 104 does not include covers or plugs that need to be installed in the field after bolt tightening. Accordingly, installation time and installation errors are reduced.

Figure 3:
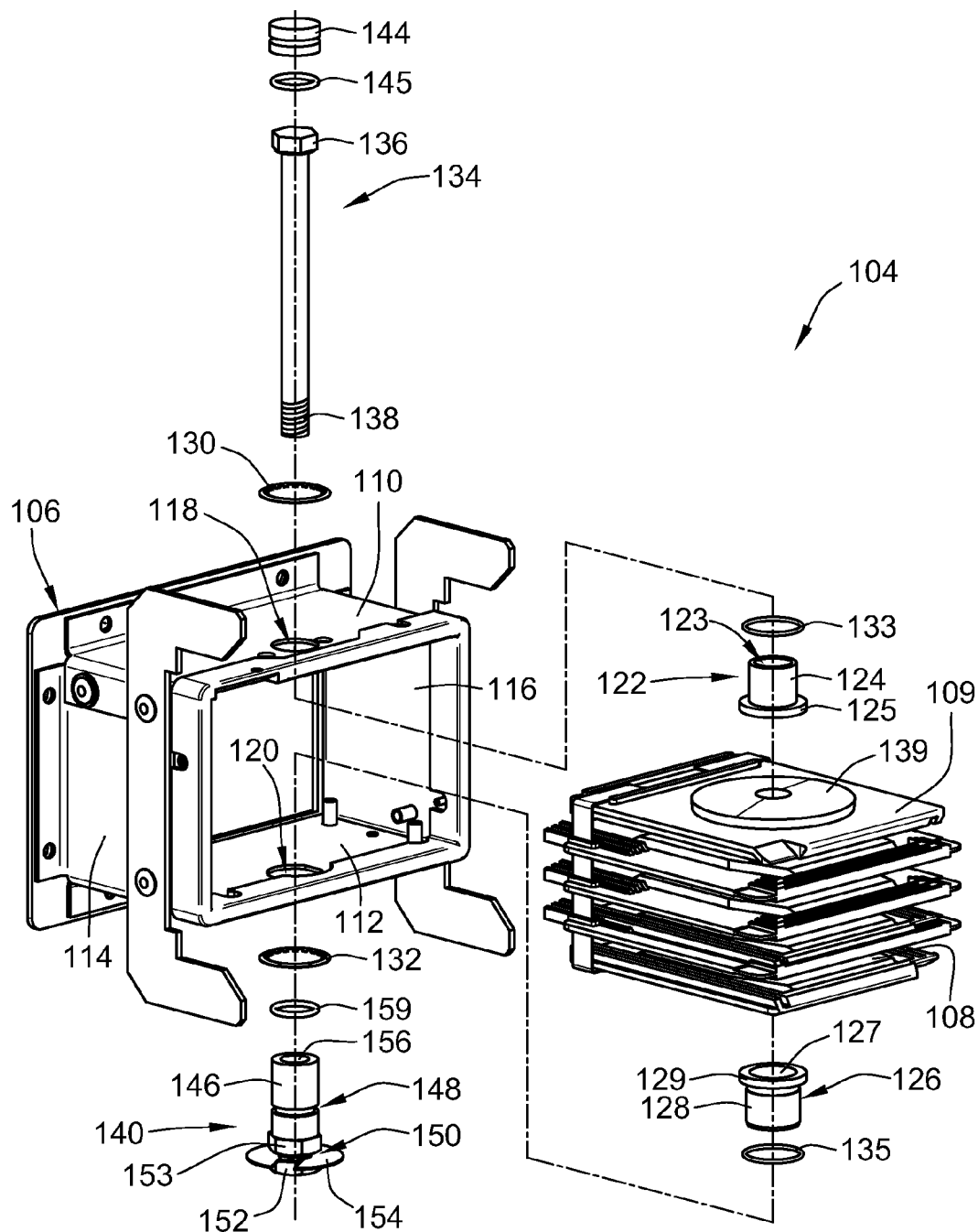
FIG. 3 is an exploded assembly view of the bolt-on joint shown in FIG. 1.
Figure 4:
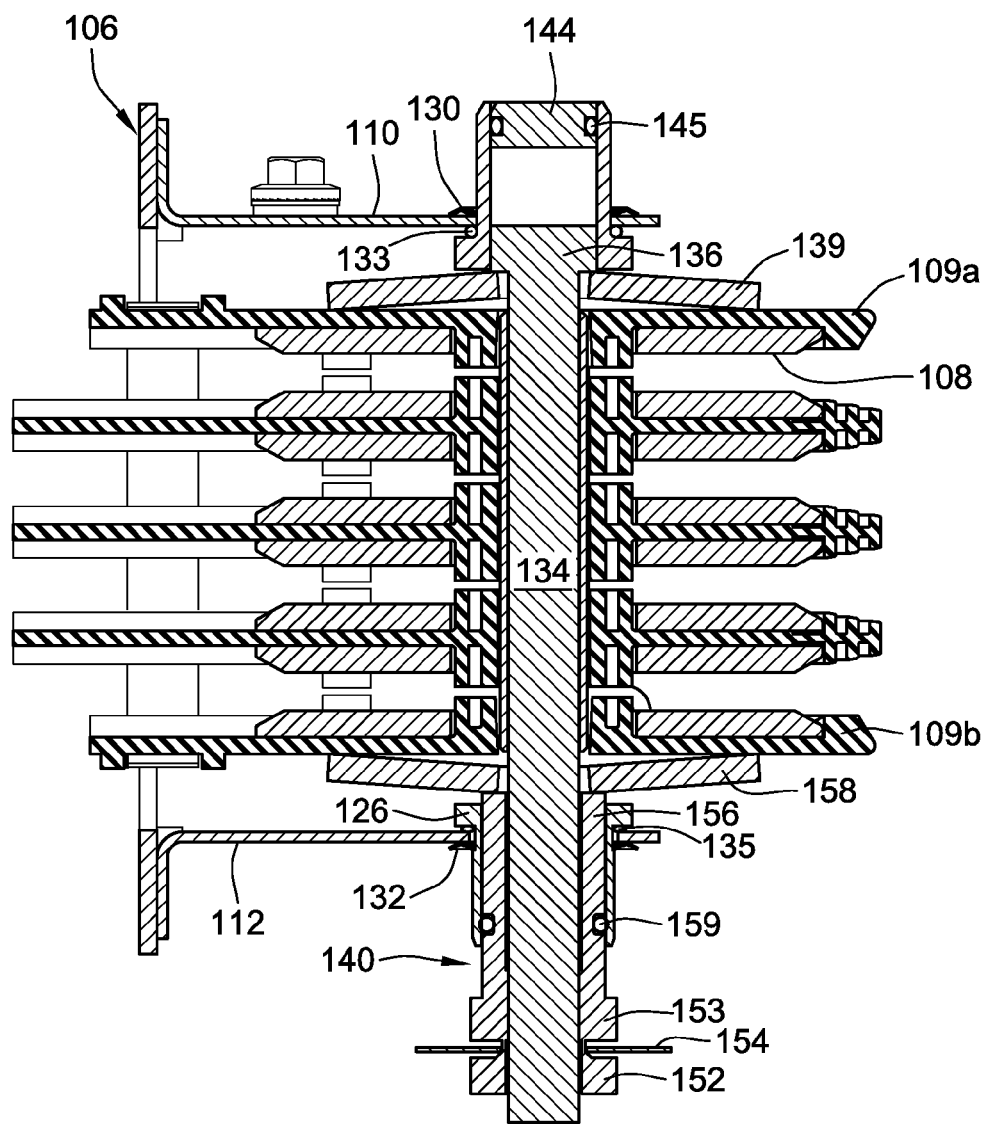
FIG. 4 is a cross-sectional assembled view of the bolt-on joint shown in FIG. 1.

Referring to FIGS. 3 and 4, the housing 106 of the bolt-on joint 104 has a plurality of supporting plates, including an upper plate 110, a lower plate 112, a left plate 114, and a right plate 116. The upper plate 110 has an upper bolt hole 118 and the lower plate 112 has a lower bolt hole 120. The upper bolt hole 118 is aligned with the lower bolt hole 120.

An upper sleeve 122 is inserted in the upper bolt hole 118 and a lower sleeve 126 is inserted in the lower bolt hole 120. Each sleeve has a generally tubular shape with a through hole 123, 127 and a main region 124, 128 that extends from a collar 125, 129. The upper sleeve 122 is mounted to the upper plate 110 with an upper retaining ring 130, and the lower sleeve 126 is mounted to the lower plate 112 with a lower retaining ring 132. Specifically, the main region 124 of the upper sleeve 122 is inserted through the upper bolt hole 118, having the collar 125 in contact with the upper plate 110 inside the housing 106. The upper retaining ring 130 is positioned outside the housing 106 and in contact with the upper plate 110 to secure the upper sleeve 122 to the upper plate 110. Similarly, the main region 128 of the lower sleeve 126 is inserted through the lower bolt hole 120, having the collar 129 in contact with the lower plate 112 inside the housing 106. The lower retaining ring 132 is positioned outside the housing 106 and in contact with the lower plate 112 to secure the lower sleeve 126 to the lower plate 112.

To form a seal between the upper sleeve 122 and the housing 106, an upper sleeve gasket 133 is mounted between the collar 125 of the upper sleeve 122 and an interior surface of the upper plate 110 of the housing 106. Similarly, to form a seal between the lower sleeve 126 and the housing 106, a lower sleeve gasket 135 is mounted between the collar 129 of the lower sleeve 126 and an interior surface of the lower plate 112 of the housing 106.

Inside the through hole 123 of the upper sleeve 122, a bolt 134 is inserted such that a bolt head 136 is axially movable to compress the conductors 108 when a threaded end 138 of the bolt 134 is tightened with a nut 140 from the bottom of the joint assembly 104. The bolt head 136 is completely inserted in the through hole 123 of the upper sleeve and is in contact with an upper washer (e.g., a Belleville washer) 139, which is in contact with an upper insulator 109a of the insulators 109 of the joint assembly 104.

The through hole 123 of the upper sleeve 122 is shaped to prevent rotational movement of the bolt head 136 relative to the upper sleeve 122. In a preferred embodiment, the through hole 123 can have a hexagonal shape, to match the bolt head 136, a D-shape, or any other shape that restricts rotational movement of the bolt head 136. Similarly, the upper bolt hole 118 and the lower bolt hole 120 can have shapes (e.g., a D-shape) such that rotational movement of the upper sleeve 122 relative to the upper bolt hole 118 and of the lower sleeve 126 relative to the lower bolt hole 120 is prevented.

To seal the upper sleeve 122 from water or other contaminants, an upper sleeve seal 144 includes a plug and a corresponding plug gasket 145 that are inserted within the through hole 123 to form a bolt-sealed zone for preventing water entry into the housing 106. An internal bolt clearance separates the bolt head 136 from the plug 144 to allow movement of the bolt 134 when tightening or retightening the bolt 134 to the nut 140. The upper sleeve seal 144 is press-fitted into the upper sleeve 122. As such, frictional forces hold the upper sleeve seal 144 connected within the upper sleeve 122. Alternatively, the upper sleeve seal 144 can be attached to the upper sleeve 122 using any other attachment methods, such as using adhesives.

According to one example, the nut 140 and bolt 134 is a two-hex system in the manner of a Visi-Tite® system from Square D Company. The nut 140 is a torque limiting nut having a main body 146, with an exterior groove 148, and a tightening end 150. The tightening end 150 is a double hex end that includes a primary hex 152, which is intended to break (or shear) off when a predetermined torque force is reached, and a secondary hex 153, which remains integral (or intact) with the nut 140 after the primary hex 152 is broken. When the bolt-on joint 104 is assembled, and the bolt 134 is tightened with the nut 140, the primary hex 152 breaks to indicate that the bolt 134 is properly torqued. The secondary hex 153 is used when maintenance or readjustment is required in the field.

The nut 140 further includes a Visi-Tite® torque indicator 154 that is located between the primary hex 152 and the secondary hex 153. The torque indicator 154 may remain in position after the primary hex 152 is removed (i.e., twists off).

Referring specifically to FIG. 4, the nut 140 is inserted into the through hole 127 of the lower sleeve 126, with an upper end 156 of the nut 140 being in contact with a lower Belleville washer 158, which is in contact with a lower insulator 109b of the insulators 109. A nut gasket in the form of an o-ring 159 is accepted in the groove 148 of the nut 140 and when positioned inside the through hole 127 of the lower sleeve 126 forms a sealed zone for preventing water entry into the housing 106. Thus, the tightening end 150 of the nut 140 is located outside to the sealed zone to provide access to the nut 140, for maintenance purposes, without disturbing the sealed zone. In other words, tightening of the nut 140 does not require the removal of any covers or plugs.

The o-ring 159 is radially compressed between the groove 148 of the nut 140 and the lower sleeve 126 for proper sealing. However, the nut 140 is free to twist and/or move upward to compress the joint during tightening.

According to an alternative embodiment, the upper sleeve and/or the lower sleeve could be formed integral with the respective one of the upper plate and the lower plate. The upper sleeve and/or the lower sleeve are eliminated as separate components by integrating their respective functions into the housing. For example, the upper plate can have a thickness that is sufficiently large to accommodate receiving the bolt head, wherein the bolt head is inserted and movable within the upper bolt hole. In other words, increasing the thickness of the upper plate allows the upper bolt hole to function as the through hole of the upper sleeve.

Figure 5:
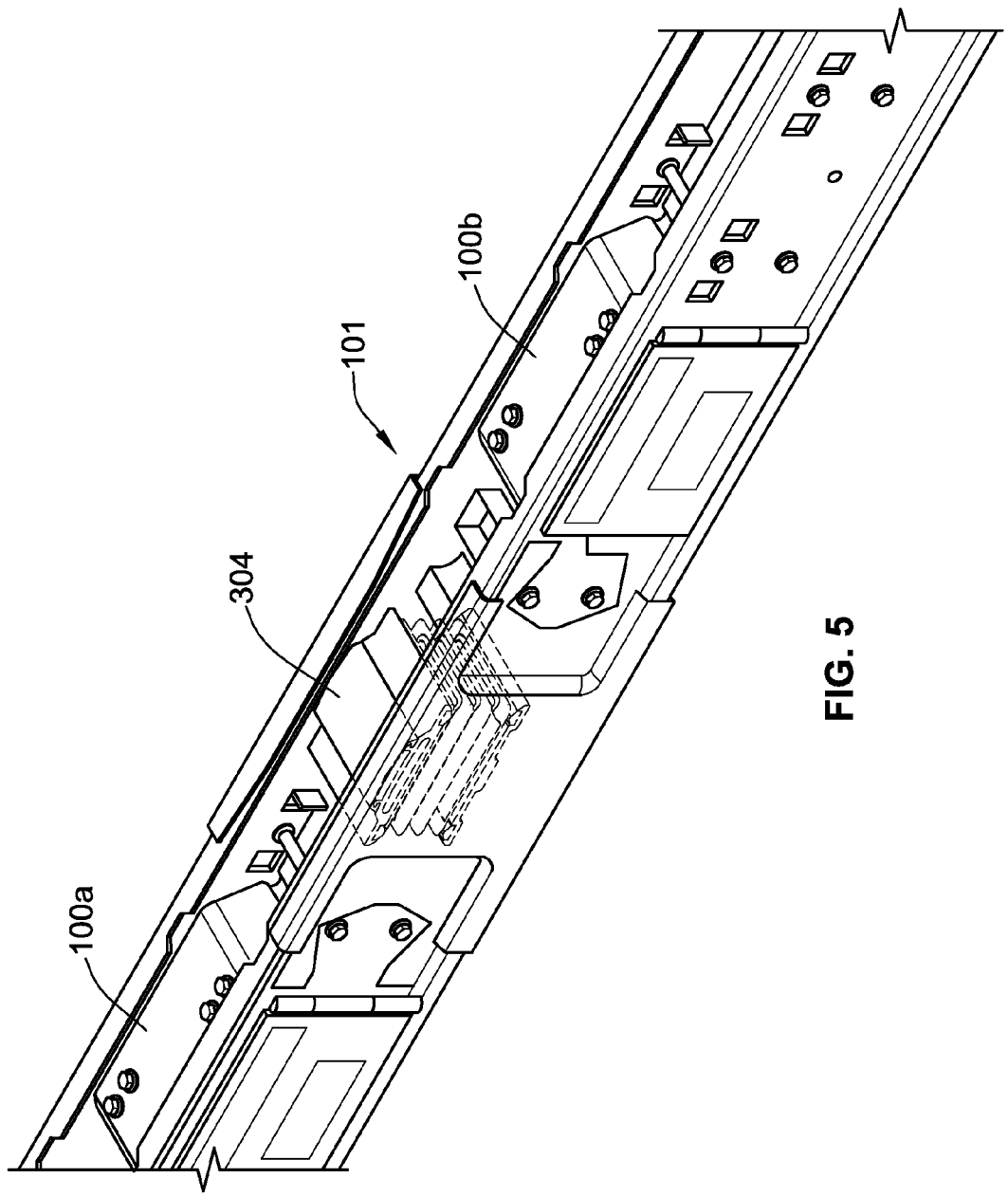
FIG. 5 is a perspective view of a joint pack connecting two adjacent busway sections.
Figure 6:
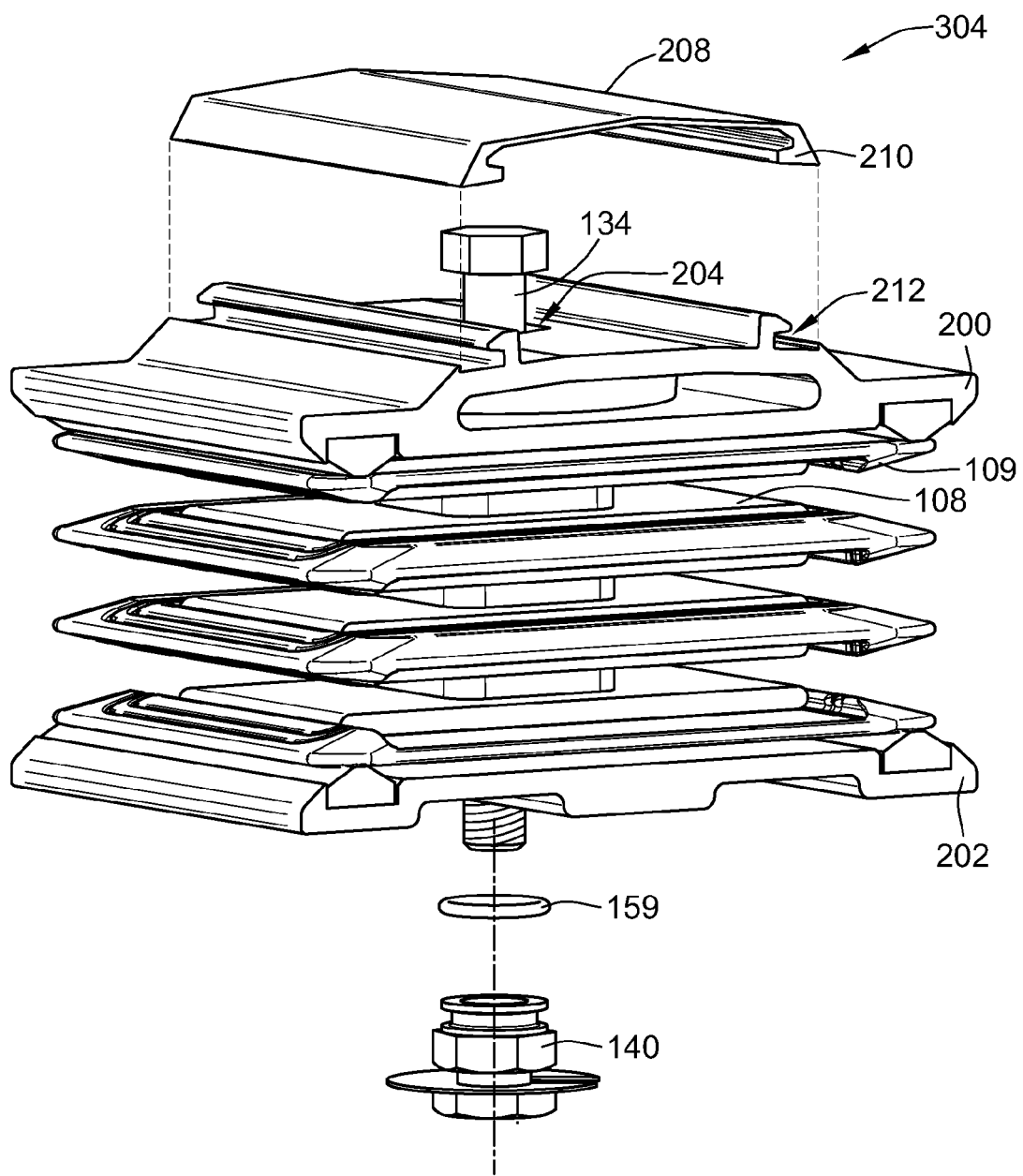
FIG. 6 is a perspective assembly view of the joint pack of FIG. 6.

Referring to FIGS. 5 and 6, according to another embodiment, a second joint assembly 304 is a joint pack assembly for connecting adjacent busway sections 100a, 100b. The joint pack assembly 304 is mounted within a housing 101 of the busway sections and connects adjacent busbars via the conductors 108. As such, the housing 106 of the joint assembly 104 for the plug-in unit 102, described in reference to FIGS. 1-4, is not required in this embodiment.

In the joint pack assembly 304, the conductors 108 (and associated insulators 109) are constrained with an upper cover 200 and a lower cover 202, which, in this embodiment, replace the upper plate 110 and the lower plate 112 of the housing 106 of the joint assembly 104 for the plug-in unit 102. Similar to the upper plate 110, the upper cover 200 is, generally, a plate that includes a receiving hole for receiving the bolt head 136.

Based on the sufficiently large thickness of the upper cover 200, the upper sleeve 122 is not required because the features of the upper sleeve 122 have been integrated within the upper cover 200. Specifically, the upper cover 200 has an upper receiving bolt hole 204 (similar to the through hole 123 of the upper sleeve 122) in which the bolt 134 is inserted. The upper receiving bolt hole 204 can be sealed, for example, using a seal similar to the upper sleeve seal 144, 145 described above in reference to the joint assembly 104 for the plug-in unit 102. Similarly, the lower sleeve 126 is not required because the lower cover 202 has a lower receiving bolt hole (not shown), which is similar to the through hole 127 of the lower sleeve 126. The nut 140 is inserted in the lower receiving bolt hole.

In addition to or instead of the upper sleeve seal 144, a top seal 208 is mounted to the upper cover 200 during initial assembly of the joint pack assembly 304 at the factory. Similar to the upper sleeve seal 144, the top seal 208 prevents ingress of environmental contaminants into the upper receiving bolt hole 204. The top seal 208 is connected to the upper cover 200 via any connecting methods. According to one connecting method, the top seal 208 has a plurality of rail ends 210 that slide into receiving rail slots 212 of the upper cover 200. Field installation of the joint pack assembly 304 does not require the removal of the top seal 208 because the nut 140 is accessible for tightening purposes from the bottom (similar to the joint assembly 104 for the plug-in unit 102).

In contrast to present joint assemblies, the joint assemblies 104 and 304 do not require field installation of covers and/or plugs after joint tightening to achieve protection from environmental elements (e.g., water). Thus, the joint assemblies reduce field installation time between the plug-in unit 102 and the busway section 100 or between the adjacent busway sections 100a, 100b. The joint assemblies also reduce installation errors because there are no covers or plugs that can be improperly installed or omitted in the field which would render the joint assemblies vulnerable to water ingress. The joint assemblies further reduce time for performing maintenance, wherein a joint can be inspected and re-tightened without the removal of covers or plugs.

Figure 7:
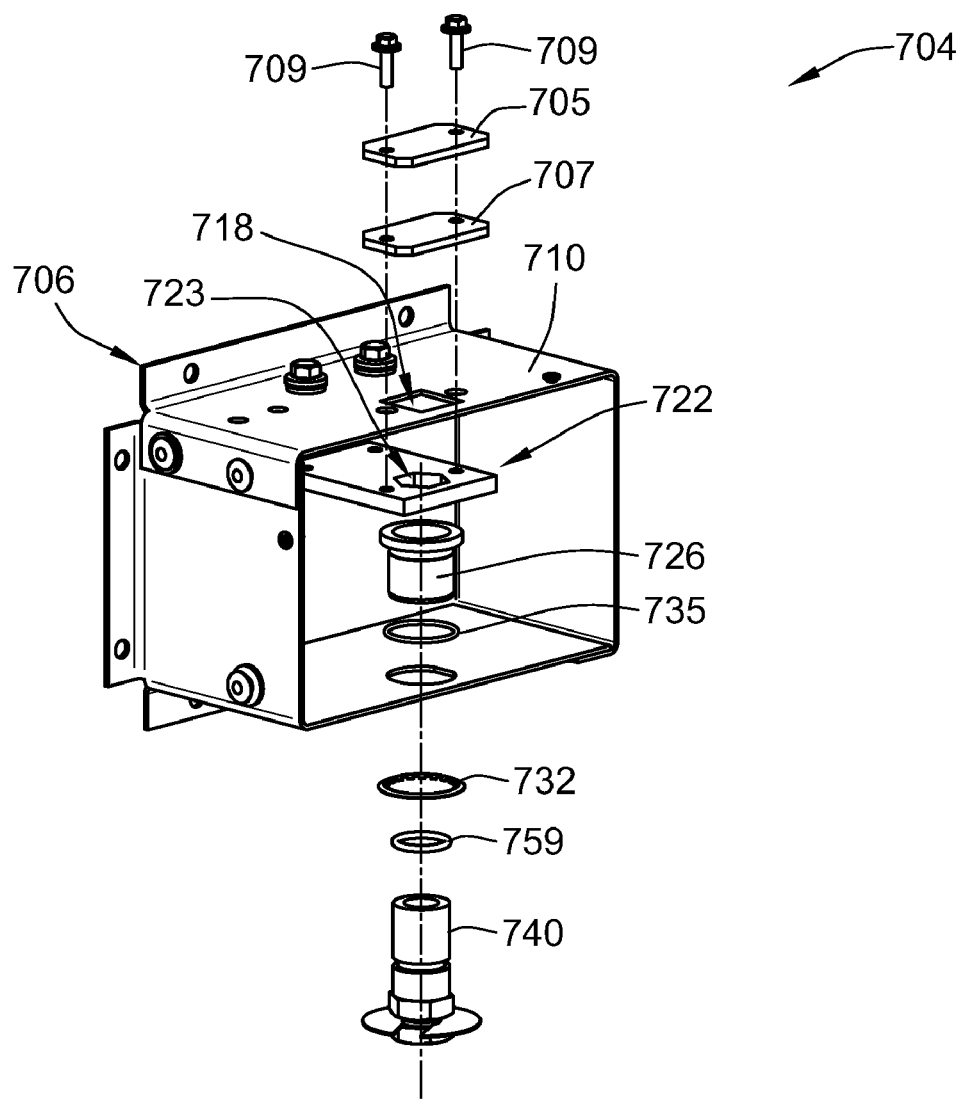
FIG. 7 is an exploded assembly view of an alternative bolt-on joint.

In reference to FIG. 7, a bolt-on joint 704 includes a bolt cover 705 and cover gasket 707 (instead of the plug 144 and plug gasket 145 of the bolt-on joint 104 described above in reference to FIGS. 3 and 4). The bolt cover 705 and the cover gasket 707 are connected to a housing 706 of the bolt-on joint 704 with a couple of fastener bolts 709. Specifically, the bolt cover 705 and the cover gasket 707 are connected on an external surface of an upper plate 710 of the joint housing 706, and seal an upper bolt hole 718 to prevent water entry into the joint housing 706 through the upper bolt hole 718.

The bolt-on joint 704 further includes an upper member 722 (in the form of a plate) that is mounted on an internal surface of the upper plate 710 of the joint housing 706. The upper member 722 replaces the upper sleeve 122 of the bolt-on joint 104. The upper member 722 includes a through hole 723 having a generally hexagonal shape. The shape of the through hole 723 permits a bolt (such as bolt 134) to be inserted inside such that rotational movement of a bolt head is restricted.

Similarly to the bolt-on joint 104 described above, the bolt-on joint 704 of this alternative embodiment includes a lower sleeve 726 and a lower sleeve gasket 735 mounted to the joint housing 706 via a lower retaining ring 732. The bolt-on joint 704 also includes a nut 740, and an o-ring 759, that are coupled to the bolt (not shown) and the joint housing 706. The mounting and functions of these components are similar to the corresponding components described in reference to the bolt-on joint 104.

While particular embodiments, aspects, and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A joint assembly for an electrical busway system, the joint assembly comprising:
   a joint housing having an upper plate and a lower plate, the lower plate having a nut-receiving hole;
   a plurality of electrical conductors mounted in the joint housing between the upper plate and the lower plate;
   a bolt coupled to the joint housing and the electrical conductors for applying compression to the electrical conductors;
   a nut for connecting to a threaded end of the bolt, the nut having a main body positioned at least in part within the nut-receiving hole and a tightening end positioned outside the nut-receiving hole; and
   a nut gasket located on the main body of the nut and positioned within the nut-receiving hole to form a sealed zone for preventing water entry into the joint housing.

2. The joint assembly of claim 1, wherein the nut is a torque limiting nut having a double hex end, the double hex end including a primary hex and a secondary hex, wherein the primary hex breaks when a predetermined torque force is reached.

3. The joint assembly of claim 2, wherein the torque limiting nut includes a torque indicator, the torque indicator being positioned outside the nut-sealed zone.

4. The joint assembly of claim 1, wherein the nut includes a groove on the main body, the nut gasket being mounted in the groove.

5. The joint assembly of claim 1, wherein the nut gasket is an o-ring.

6. The joint assembly of claim 1, further comprising a lower sleeve that is mounted within the nut-receiving hole of the lower plate, the lower sleeve having a through hole in which the nut gasket is mounted.

7. The joint assembly of claim 6, further comprising a lower retaining ring for securing the lower sleeve to the lower plate.

8. The joint assembly of claim 6, further comprising a lower sleeve gasket mounted between the lower plate and the lower sleeve.

9. The joint assembly of claim 1, further comprising an upper sleeve positioned in the upper plate for receiving internally a bolt head of the bolt.

10. The joint assembly of claim 9, wherein the upper sleeve has an internal shape such that rotation of the bolt head relative to the upper sleeve is prevented.

11. The joint assembly of claim 10, wherein the internal shape is selected from a group consisting of a D-shape and a hex-shape.

12. The joint assembly of claim 9, further comprising an upper sleeve seal mounted at least in part within the upper sleeve to form a bolt-sealed zone for preventing water entry into the joint housing, an internal bolt clearance separating the bolt head and the upper sleeve seal.

13. The joint assembly of claim 9, further comprising an upper retaining ring for securing the upper sleeve to the upper plate.

14. The joint assembly of claim 1, further comprising an upper cover mounted near an upper one of the electrical conductors and a lower cover mounted near a lower one of the electrical conductors, a bolt seal being mounted to the upper cover to prevent water entry into the joint housing.

15. The joint assembly of claim 1, further comprising a bolt cover and a cover gasket mounted to an external surface of the upper plate of the joint housing, the bolt cover and the cover gasket forming a seal for preventing water entry into the joint housing via an upper bolt hole that is formed in the upper plate.

16. An electrical system comprising:
   a plurality of busway sections including a first busway section and an adjacent second busway section, each of the busway sections having stacked busbars; and
   a joint assembly for mounting the first busway section to the adjacent second busway section busbar, the joint assembly including
      a plurality of electrical conductors and insulators mounted in a joint housing, the electrical conductors being in contact with corresponding ones of the busbars;
      a bolt for securing the electrical conductors to the joint housing, the bolt having a bolt head and a threaded end;
      an upper sleeve in an upper plate of the joint housing, the bolt head being located internally within the upper sleeve;
      a lower sleeve in a lower plate of the joint housing;
      a nut having a tubular body and an exposed end, the tubular body having a gasket-retaining groove that is mounted within the lower sleeve, the exposed end being located outside the lower sleeve; and
      a nut gasket mounted in the groove of the tubular body for forming a water-tight seal between the nut and the lower sleeve.

17. The electrical system of claim 16, further comprising a bolt seal mounted at least in part within the upper sleeve for forming a water seal between the bolt and the upper sleeve.

18. The electrical system of claim 16, further comprising an upper cover and a lower cover, the electrical conductors being mounted in the joint housing between the upper cover and the lower cover, the upper sleeve being formed integrally within the upper cover, a bolt seal being mounted to the upper cover for forming a water seal between the bolt and the upper sleeve.

19. The electrical system of claim 16, further comprising an upper washer mounted between the bolt head and an upper insulator of the insulators, a lower washer being mounted between the nut and a lower insulator of the insulators, whereby tightening of the nut relative to the bolt forces axial movement of the upper washer and the lower washer toward each other such that the plurality of electrical conductors are in a compressed state.

20. The electrical system of claim 16, wherein at least one of the upper sleeve and the lower sleeve is formed integral with the joint housing.

21. The electrical system of claim 16, further comprising an upper gasket mounted between the upper sleeve and the upper plate and a lower gasket mounted between the lower sleeve and the lower plate.

22. The electrical system of claim 16, wherein the nut is a torque limiting nut having a torque indicator that is positioned externally of the lower sleeve.

23. The electrical system of claim 16, wherein the nut gasket is an o-ring.

24. The electrical system of claim 16, wherein the upper sleeve has an internal shape such that rotational movement of the bolt head relative to the upper sleeve is prevented.

* * * * *